United States Patent
Prasad

(10) Patent No.: US 8,751,724 B2
(45) Date of Patent: Jun. 10, 2014

(54) DYNAMIC MEMORY RECONFIGURATION TO DELAY PERFORMANCE OVERHEAD

(75) Inventor: Aravinda Prasad, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 13/236,966

(22) Filed: Sep. 20, 2011

(65) Prior Publication Data

US 2013/0073779 A1 Mar. 21, 2013

(51) Int. Cl.
*G06F 12/02* (2006.01)
*G06F 12/10* (2006.01)

(52) U.S. Cl.
USPC .. 711/6; 711/171; 711/E12.002; 711/E12.059

(58) Field of Classification Search
USPC .............. 711/170, E12.002, 6, 171, E12.059; 345/530, 543
See application file for complete search history.

(56) References Cited

U.S. PATENT DOCUMENTS

| | | | |
|---|---|---|---|
| 8,487,946 B2 * | 7/2013 | Stauffer et al. | 345/530 |
| 2005/0235124 A1 * | 10/2005 | Pomaranski et al. | 711/170 |
| 2010/0325374 A1 * | 12/2010 | Cypher et al. | 711/157 |
| 2011/0138147 A1 * | 6/2011 | Knowles et al. | 711/170 |

* cited by examiner

*Primary Examiner* — Mardochee Chery
(74) *Attorney, Agent, or Firm* — Steven M. Greenberg, Esq.; CRGO Law

(57) ABSTRACT

Embodiments of the present invention provide a method, system and computer program product for dynamic main memory reconfiguration in virtual memory management. In an embodiment of the invention, a method for dynamic main memory reconfiguration in virtual memory management can include receiving a memory access directive in a host computer, determining a low free space condition in a memory allocation to satisfy the memory access directive, augmenting the memory allocation with a mapping to additional memory in the host computer in lieu of page swapping in response to the low free space condition, and satisfying the memory access directive. Additionally, the method can include determining an excess free space condition in the memory allocation and removing from the memory allocation a selection of allocated memory in the host computer.

10 Claims, 1 Drawing Sheet

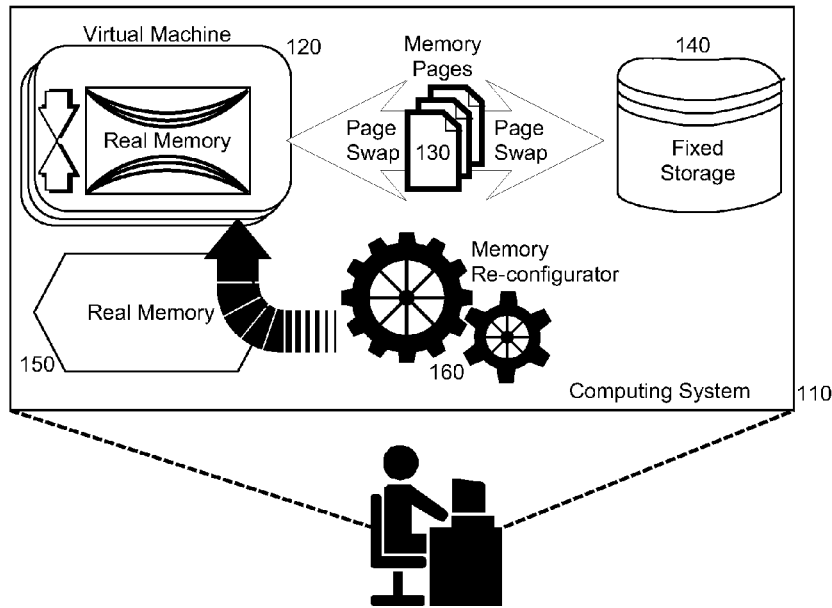
FIG. 1
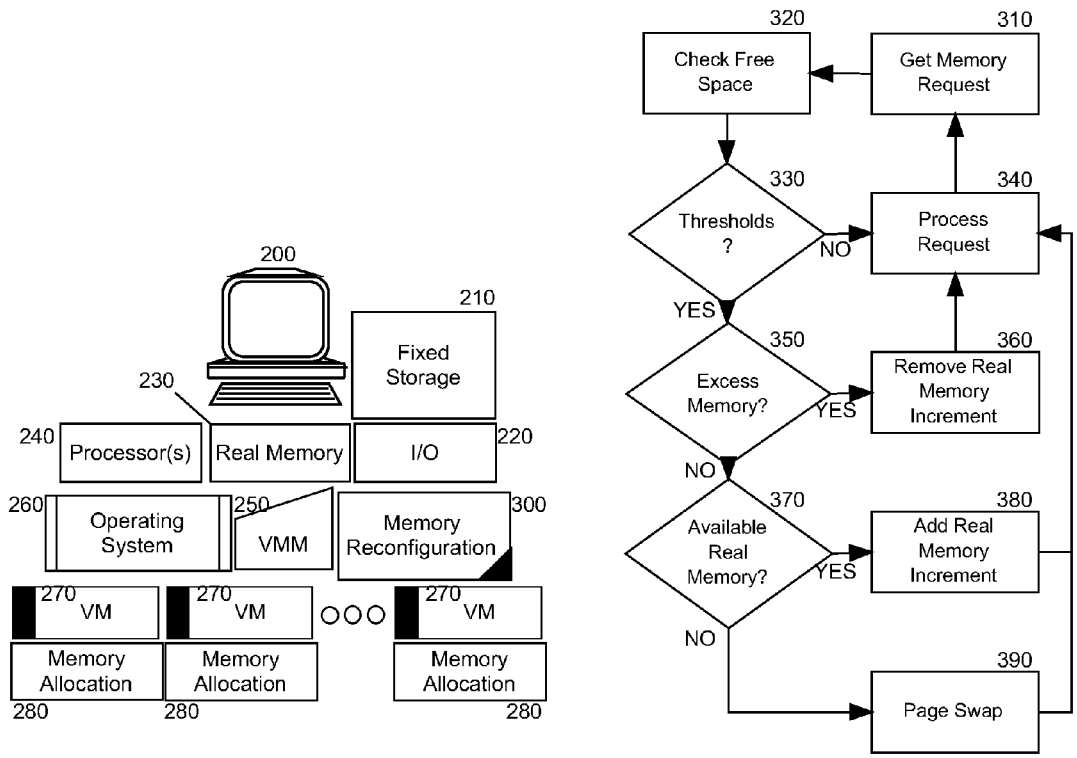
FIG. 2
FIG. 3

DYNAMIC MEMORY RECONFIGURATION TO DELAY PERFORMANCE OVERHEAD

BACKGROUND OF THE INVENTION

1. Field of the Invention

The present invention relates to memory management and more particularly to page swapping in virtual memory during memory management.

2. Description of the Related Art

In computing, virtual memory is a memory management technique developed for multitasking kernels. In virtual memory management schemes, the various forms of computer data storage such as random-access memory and disk storage can be virtualized, allowing a computer program to be designed as though there is only one type of memory—"virtual" memory—that behaves just as directly addressable read/write random access memory (RAM). Computer systems employing virtual memory use hardware memory more efficiently than systems without virtual memory and make the programming of applications easier by hiding memory fragmentation, by delegating to the kernel the burden of managing the memory hierarchy and by obviating the need to relocate program code or to access memory with relative addressing.

Memory virtualization is a generalization of the concept of virtual memory. A technique used by virtual memory operating systems to ensure that requested data can be made available as quickly as possible. In memory virtualization, the operating system copies a certain number of memory pages from main memory to disk. When a program requires data residing within a page of memory not present in main memory, the operating system copies the required page from disk storage into memory while "swapping" another page already in main memory back to the disk storage. Within the art, the act of writing a page of memory from disk storage to main memory is known as "paging in" while the act of writing a page of memory from main memory to disk storage is known as "paging out".

The determination of which memory page to page out during a memory swapping operation generally is not random. Rather, a number of algorithms exist for determining which memory pages are to be subject to paging out during memory swapping. For example, it is known in the art to apply the least recently used (LRU) algorithm during memory swapping in which the least frequently used memory page is selected for paging out. More specifically, when the number of free frames in real memory falls below a certain threshold the virtual memory manager invokes an LRU daemon, which applies an LRU algorithm to select pages in main memory for paging out to disk.

As it is well known in the art, invoking the LRU algorithm can involve a degree of performance overhead as the page-replacement object code cycles through the page frame table (PFT) examining each reference bit for each page. If the page is unreferenced and is "stealable" and not pinned, then the page is placed on the "free list". If the page is not modified the page can be immediately placed on the free list. Otherwise the page is placed on the input/output (I/O) list for a page out. Thus, the LRU algorithm can consume significant processing cycles in identifying the page or pages to steal. Additionally, paging in and out to fixed storage can impose a significant performance overhead because of I/O latency to fixed storage.

BRIEF SUMMARY OF THE INVENTION

Embodiments of the present invention address deficiencies of the art in respect to page swapping and provide a novel and non-obvious method, system and computer program product for dynamic main memory reconfiguration in virtual memory management. In an embodiment of the invention, a method for dynamic main memory reconfiguration in virtual memory management can include receiving a memory access directive in a host computer, determining a low free space condition in a memory allocation to satisfy the memory access directive, augmenting the memory allocation with a mapping to additional memory in the host computer in lieu of page swapping in response to the low free space condition, and satisfying the memory access directive. Additionally, the method can include determining an excess free space condition in the memory allocation and removing from the memory allocation a selection of allocated memory in the host computer.

In another embodiment of the invention, a computer data processing system can be configured for dynamic main memory reconfiguration in virtual memory management. The system can include a host computer with at least one processor, fixed storage and real memory, an operating system hosting a virtual machine, a memory allocation corresponding to the virtual machine and a virtual memory manager managing page swapping between the memory allocation and the fixed storage. Of note, a memory reconfiguration module can be coupled to the virtual memory manager. The module can include program code enabled to respond to a low free space condition in the memory allocation to satisfy a received memory access directive by augmenting the memory allocation with a mapping to additional memory in the real memory of the host computer in lieu of page swapping by the virtual memory manager in response to the low free space condition.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for dynamic main memory reconfiguration in virtual memory management;

FIG. 2 is a schematic illustration of a computer data processing system configured for dynamic main memory reconfiguration in virtual memory management; and, FIG. 3 is a flow chart illustrating a process for dynamic main memory reconfiguration in virtual memory management.

DETAILED DESCRIPTION OF THE INVENTION

Embodiments of the invention provide for dynamic main memory reconfiguration in virtual memory management. In accordance with an embodiment of the invention, virtual memory management can be performed by a virtual memory manager as between fixed storage and main memory. When free space in main memory falls below a threshold level, instead of triggering page swapping, main memory can be augmented for management by the virtual memory manager with additional real memory to increase free space in main memory. Conversely, when a threshold free space is available, previously added real memory can be removed from use by the virtual memory manager from main memory. Thus, when free space in main memory falls below the threshold level, only when no additional real memory can be added to augment main memory, will page swapping occur.

In further illustration, FIG. 1 pictorially shows a process for dynamic main memory reconfiguration in virtual memory management. As shown in FIG. 1, a computing system 110 can include different virtual machines 120 enjoying separate process address spaces in which different applications can execute. Each of the virtual machines 120 can be allocated a selection of logical memory blocks mapped into real memory 150 of the computing system 110. Page swapping can be enabled to swap memory pages 130 in and out between the logical memory blocks of the virtual machines 120 and fixed storage 140 as required when different ones of the virtual machines 120 lack available logical memory blocks to satisfy memory access directives.

In this regard, during operation, within a given one of the virtual machines 120, a memory access directive can be processed in accordance with a determination by a memory re-configurator 160 of whether or not adequate logical memory blocks are available for the given one of the virtual machines 120 to satisfy the request. If not, to the extent additional logical memory blocks can be allocated from real memory 150, the memory re-configurator 160 can add additional logical memory blocks to the given one of the virtual machines 120 so as to permit satisfaction of the memory access directive. Optionally, when no addition logical memory blocks can be added from real memory 150 for use by the given one of the virtual machines 120, the memory re-configurator 160 can attempt to remove blocks of real memory 150 from others of the virtual machines 120. Only when no additional logical memory blocks can be added from real memory 150 or from others of the virtual machines 120 for use by the given one of the virtual machines 120 will page swapping be triggered. In this way, the processing overhead of page swapping can be delayed or even avoided in the face of temporary bursts in memory requirements in a given one of the virtual machines.

The process described in connection with FIG. 1 can be implemented within a computer data processing system. In yet further illustration, FIG. 2 schematically shows a computer data processing system configured for dynamic main memory reconfiguration in virtual memory management. The system can include a host computer 200 that includes one or more processors 240 with one or more respective processing cores, real memory 230, input/output circuitry 220 and fixed storage 210.

The host computer 200 can be configured to support the execution of an operating system 260 enabled to host the operation of one or more different virtual machines 270. A virtual memory manager 250 can be coupled to the operating system 260 and can be configured to manage access to the real memory 230 by the different virtual machines 270 so as to establish a memory allocation 280 of logical memory blocks for each of the virtual machines 270. Additionally, the virtual memory manager 250 can be configured to perform page swapping in response to a determination that a memory access request in a given one of the virtual machines 270 cannot be satisfied by a corresponding memory allocation 280.

Of note, a memory reconfiguration module 300 can be coupled to the virtual memory manager. The memory reconfiguration module 300 can include program code that when executed in the real memory 230 by one or more of the processors 240 of the host computer can be enabled to determine when free memory in the memory allocation 280 for a corresponding one of the virtual machines 270 has dropped below a threshold level. The program code additionally can be enabled in response to such a determination to augment the memory allocation 280 with an additional number of logical memory blocks in the real memory 230 so as to avoid the necessity of page swapping. The program code additionally can be enabled in response to a determination that excess free memory exists in the memory allocation 280 beyond a threshold value to remove from the memory allocation 280 a number of logical memory blocks in the real memory 230.

In even yet further illustration of the operation of the memory reconfiguration module 300, FIG. 3 is a flow chart illustrating a process for dynamic main memory reconfiguration in virtual memory management. Beginning in block 310, a memory access directive can be received for a memory allocation in a virtual machine. In block 320, free space in the memory allocation can be determined and in decision block 330, it can be determined whether or not either not enough free space remains in the memory allocation to satisfy the memory access directive, or excess free space remains in the memory allocation. In the event that neither circumstance has arisen, the memory access directive can be processed in block 340. Otherwise, the process can continue through decision block 350.

In decision block 350, it can be determined whether or not excess free space remains in the memory allocation. If so, in block 360 one or more logical memory blocks can be removed from the memory allocation for the virtual machine and the memory access directive can be processed in block 340. Otherwise, in decision block 370, it can be determined if additional logical memory blocks can be re-allocated from other virtual machines for use within the memory allocation of the virtual machine, or if additional logical memory blocks can be allocated in real memory for use within the memory allocation of the virtual machine. If so, in block 380 the memory allocation of the virtual machine can be augmented by one or more of the logical memory blocks available from other virtual machines or from real memory as the case may be and the memory access directive can be processed in block 340.

Optionally, the identity, number and/or size of the logical memory blocks to be mapped to the memory allocation can be limited statically by a pre-configuration or dynamically by application of one or more rules. For example, the limitation can be a maximum number of logical memory blocks able to be mapped to the memory allocation for the virtual machine when augmenting the memory allocation. Otherwise, the memory access directive can be satisfied in block 340 only subsequent to page swapping in block 390. In particular, the page swapping can be invoked by way of an LRU daemon summoned by the virtual memory manager.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for dynamic main memory reconfiguration in virtual memory management, the method comprising:
   receiving a memory access directive in one of virtual machines hosted in a host computer;
   upon determining a low free space condition in a logical memory allocation for the virtual machine to satisfy the memory access directive, augmenting the logical memory allocation for the virtual machine with additional logical memory from a real memory in the host computer;
   attempting to remove logical memory from others of the virtual machines for use by the virtual machine when no additional logical memory can be added from the real memory for use by the virtual machine;
   triggering page swapping only when no additional logical memory can be added from the real memory or from others of the virtual machines for use by the virtual machine; and,
   satisfying the memory access directive.

2. The method of claim 1, further comprising:
   determining an excess free space condition in the memory allocation; and,
   removing from the memory allocation a selection of allocated memory in the host computer.

3. The method of claim 1, wherein augmenting the memory allocation with additional memory from the real memory in the host computer is limited to a maximum number of logical memory blocks.

4. A computer data processing system configured for dynamic main memory reconfiguration in virtual memory management, the system comprising:
   a host computer with at least one processor, fixed storage and real memory;
   an operating system hosting a virtual machine;
   a memory allocation corresponding to the virtual machine;
   a virtual memory manager managing page swapping between the memory allocation and the fixed storage; and,
   a memory reconfiguration module coupled to the virtual memory manager, the module comprising program code enabled to
   receive a memory access directive in one of virtual machines hosted in a host computer;
   upon determining a low free space condition in a logical memory allocation for the virtual machine to satisfy the memory access directive, augment the logical memory allocation for the virtual machine with additional logical memory from a real memory in the host computer;
   attempt to remove logical memory from others of the virtual machines for use by the virtual machine when no additional logical memory can be added from the real memory for use by the virtual machine;
   trigger page swapping only when no additional logical memory can be added from the real memory or from others of the virtual machines for use by the virtual machine; and
   satisfy the memory access directive.

5. The system of claim 4, wherein the additional memory comprises a selection of logical memory blocks in the real memory of the host computer.

6. The system of claim 5, wherein the program code is additionally enabled to limit the augmentation of the memory allocation to a maximum number of logical memory blocks.

7. The system of claim 4, wherein the program code is additionally enabled to remove from the memory allocation a selection of allocated memory in the host computer in response to determining an excess free space condition in the memory allocation.

8. A computer program product for dynamic main memory reconfiguration in virtual memory management, the computer program product comprising:
   a computer readable storage medium having computer readable program code embodied therewith, the computer readable program code comprising:
   computer readable program code for receiving a memory access directive in one of virtual machines hosted in a host computer;
   computer readable program code for upon determining a low free space condition in a logical memory allocation for the virtual machine to satisfy the memory access directive, augmenting the logical memory allocation for the virtual machine with additional logical memory from a real memory in the host computer;
   computer readable program code for attempting to remove logical memory from others of the virtual machines for use by the virtual machine when no additional logical memory can be added from the real memory for use by the virtual machine;
   computer readable program code for triggering page swapping only when no additional logical memory can be added from the real memory or from others of the virtual machines for use by the virtual machine; and,
   computer readable program code for satisfying the memory access directive.

9. The computer program product of claim 8, further comprising:
   computer readable program code for determining an excess free space condition in the memory allocation; and,
   computer readable program code for removing from the memory allocation a selection of allocated memory in the host computer.

10. The computer program product of claim 9, wherein augmenting the memory allocation with additional memory from the real memory in the host computer is limited to a maximum number of logical memory blocks.

* * * * *